Jan. 19, 1943.    W. S. BRINK    2,308,959
WHEEL CONSTRUCTION
Filed June 27, 1940
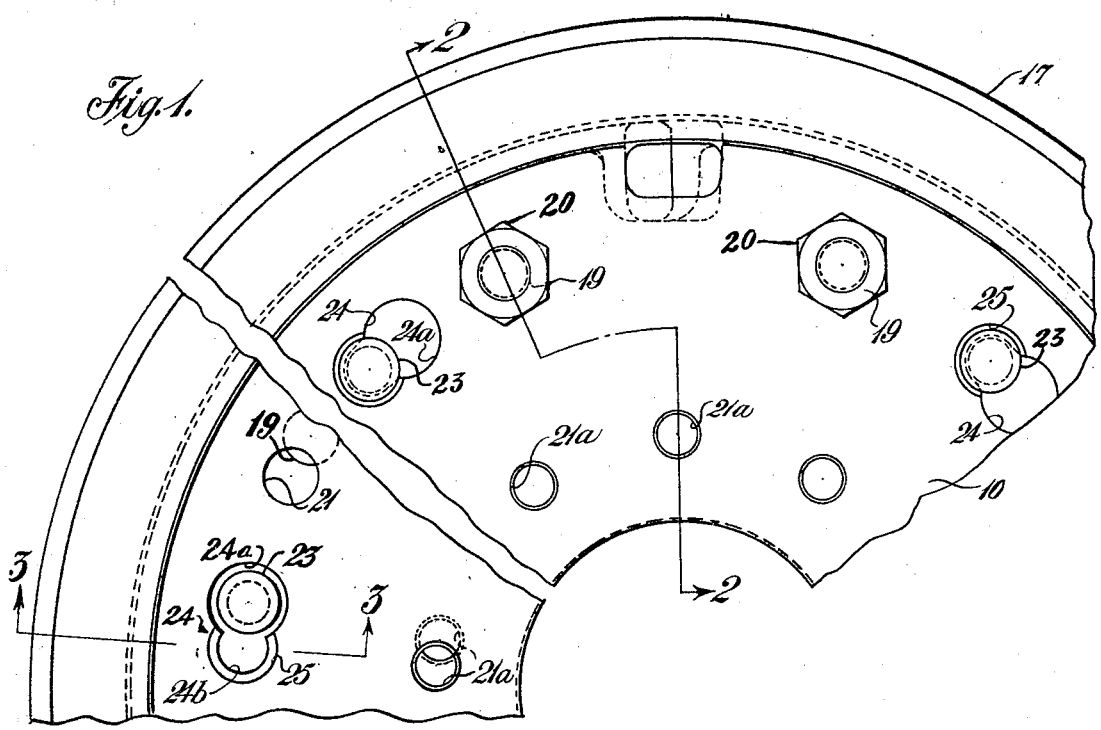
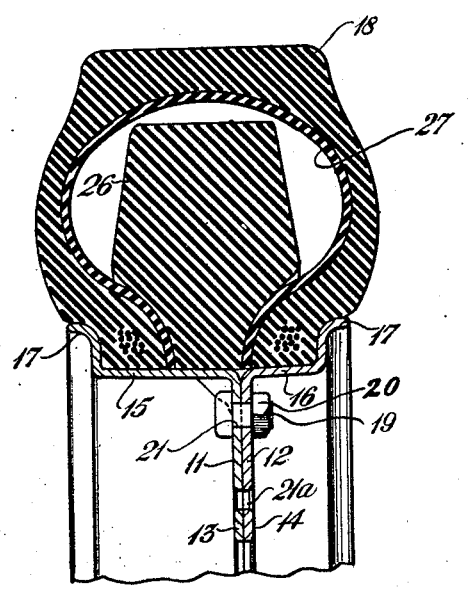
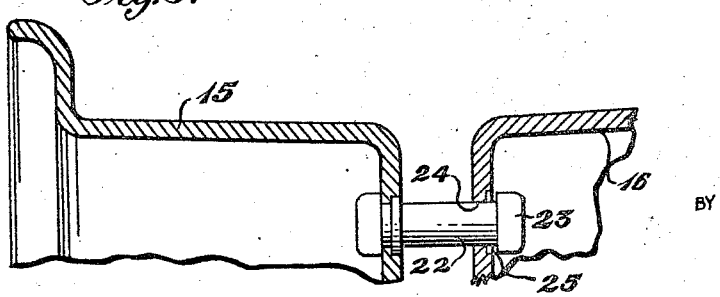
INVENTOR
Winfield S. Brink
BY Ely & Frye
ATTORNEYS Patented Jan. 19, 1943

2,308,959

UNITED STATES PATENT OFFICE 2,308,959

WHEEL CONSTRUCTION

Winfield S. Brink, Akron, Ohio, assignor to The Firestone Tire & Rubber Company, Akron, Ohio, a corporation of Ohio Application June 27, 1940, Serial No. 342,700

4 Claims. (Cl. 301—63)

This invention relates to pneumatic tire wheel constructions, especially to split wheel constructions having safety means thereon for preventing the wheel sections from being separated at an improper time.

Heretofore, various types of split wheels have been constructed with some of the wheels having types of locking pins or lugs thereon to secure the portions of the wheel together. However, all of such constructions have failed to be absolutely safe in their operation in that they are not 100% certain of preventing accidental or improper disassembly of the wheel. Hence, many accidents have been caused by attempts to take a split wheel apart when the wheel is not prepared properly for disassembly, as when the tire carried thereon still has air therein.

The general object of this invention is to provide a sturdy, uncomplicated split wheel construction which positively prevents disassembly of the wheel until such disassembly is safe and which overcomes the foregoing and other disadvantages of previous types of split wheels.

A further object of the invention is to provide a split wheel construction adapted to receive a pneumatic tire and a reenforcing member within the tire adapting the tire to be run even though punctured, which wheel can be disassembled only after the tire has been deflated.

The foregoing and other objects will be manifest from the following specification:

The invention will be described with particular reference to the accompanying drawing, in which:

Figure 1 is a fragmentary elevation of a wheel construction embodying the invention, in assembled relation;

Figure 1ª is a fragmentary elevation of a wheel construction embodying the invention, in position before assembling;

Figure 2 is a reduced scale sectional elevation on line 2—2 of Figure 1 with a tire being positioned on the wheel; and Figure 3 is a sectional elevation on line 3—3 of Figure 1ª.

Referring more specifically to the drawing, a split wheel construction 10 is shown therein. This mainly comprises two rim, or wheel sections 11 and 12 each of which includes an apertured disc 13 or 14, respectively, at its center, and an axially outwardly directed flange 15 or 16, respectively, at its periphery. These flanges 15 and 16 each have a radially outwardly directed tire retaining lip 17 at their edges so that the wheel construction 10 is adapted to receive a tire 18 thereon. The wheel sections 11 and 12 are held together to form a wheel by bolts 19, and nuts 20, that extend through a series of circumferentially spaced holes 21 formed in the discs 13 and 14 adjacent their periphery. A second series of holes 21ª are provided near the center of the discs for receiving bolts to secure the wheel assembly 10 to a hub.

To prevent the wheel sections from being taken apart when such disassembly is dangerous, as when the tire on the wheel is inflated, the disc 13 of the section 11 carries metal pins, or rivets 22 having heads 23 thereon that extend therefrom towards the wheel section 12 and through slotted apertures 24 formed therein. These apertures have enlarged portions 24ª through which the heads 23 can pass and slotted end portions 24ᵇ through which the heads can not pass. In normal assembled position, the wheel sections are so positioned that the heads 23 extend through the slotted ends 24ᵇ of the apertures 24 whereby the wheel sections can only move a short distance apart, as indicated in Figure 3. The portion of the wheel section 12 adjacent the slotted ends 24ᵇ of the apertures 24 have recesses 25 adapted to receive the heads 23 of the pins 22, formed therein for a purpose hereinafter explained.

The wheel construction of the invention is particularly adapted for use with tires that have means within the tire to permit its use even though punctured. Figure 2 shows an example of such a construction which includes an annular solid rubber cushion member 26 carried by the wheel sections 11 and 12. This cushion has a smaller outside diameter than the inside diameter of the tire 18 in which it is received and has a base portion that is tightly positioned between the beads of the tire when the tire and wheel are assembled for operation. A tube 27 is received between the cushion member 26 and the tire 18. In case the tire or tube is punctured, then the load on the wheel assembly is supported through the cushion member 26 at about its normal position and the wheel still is operable.

The wheel sections are constructed and arranged so that the pins 22 extend through the slotted portions 24ᵇ of the apertures 24 when the bolts 19 are positioned in the holes 21. Even though one attempts to disassemble the wheel construction 10 when it contains air, the wheel can not be disassembled for removing the bolts 19 merely permits relative outward movement of the wheel sections. This movement causes the heads 23 on the pins 22 to engage with the recesses 25 formed around the slotted ends of the apertures through which they extend. In a modification of the invention, the bolts 19 are longer than the pins 22, and the foregoing locking action inherently occurs on loosening bolts 19. The exact type of locking means provided to engage with the heads of the pins may be varied as long as relative arcuate and axial movement of the wheel sections is prevented when the pins extend through the slotted portion of the apertures 24 and engage with the outer surface of the wheel section 12. In all events, to free the wheel sections for disassembly, the sections must be moved towards each other to free the pin heads 23 for movement and then one of the wheel sections is rotated relative to the other to bring the heads 23 in register with the enlarged portions 24a of the apertures 24. Obviously, the wheel sections can not be moved towards each other to free the heads 23 from the recesses 25 in which they are received except when there is no air or other resistance pressure within the tire, at which time it is safe to disassemble the wheel.

In view of the foregoing it will be seen that a fool-proof split wheel is provided by the invention and that the objects of the invention are realized.

While one embodiment of the invention has been completely illustrated and described herein, modifications may be made without departing from the scope of the invention as defined in the appended claims.

What is claimed is:

1. A wheel construction comprising two metal discs having laterally directed peripheral flanges formed thereon, means for securing said discs together, said flanges being constructed and arranged to form a tire retaining seat in the wheel, one of said discs having a series of circumferentially spaced apertures therein which have corresponding end portions of reduced diameter and which are recessed on the outer surface thereof adjacent the reduced diameter portion of said apertures, a series of circumferentially spaced pins fixedly secured to the other of said discs and adapted to extend through said apertures, said pins having enlarged heads thereon constructed and arranged to pass through said apertures but not the reduced diameter portion thereof, said heads being adapted to seat in said recessed portions of said discs when said discs are pressed apart as far as said pins permit, and removable means for removably securing said discs together in abutting relation only when said pins are associated with the reduced diameter portions of said apertures.

2. A wheel construction comprising two metal discs constructed and arranged to form a wheel having a tire receiving periphery thereon when they are associated together, one of said discs having a series of slotted apertures formed therein having portions thereof of reduced diameter which are recessed at the outer surface thereof, metal pins having enlarged heads fixedly secured to the other of said discs and adapted to extend inwardly therefrom through and beyond said slotted apertures when said discs are associated together, the heads of said pins being adapted to pass through said apertures but not through the slotted portions thereof whereby rotating said discs after said pins are placed through said apertures locks them in engagement and said pins' heads can be positioned in said recesses to hold said discs against rotational movement, and removable means for removably securing said discs together in abutting relation only when said pins are associated with the reduced diameter portions of said apertures.

3. A wheel construction for mounting a pneumatic tire comprising two metal disc-like wheel sections adapted to form a tire receiving member when secured together, locking means on one of said wheel sections for engaging with said second wheel section and preventing complete disengagement of the sections when a mounted tire has air therein, means on said second wheel section for receiving said locking means, said means on said second wheel section comprising apertures having recessed portions in the part of said wheel section thereadjacent for receiving said locking means and for engaging with said locking means to prevent movement of one wheel section with relation to the other, and means for removably securing the wheel sections tightly together.

4. In a wheel assembly for mounting a pneumatic tire so that it can be operated even though deflated without being thrown from the wheel assembly, said assembly comprising two metal rim sections, having tire engaging flanges thereon, adapted to be abutted and form a tire receiving member when secured together, said rim sections being provided with radially inwardly extending flanges on the abutted portions thereof, removable means extending between said inwardly extending flanges of said rim sections for securing said rim sections together, and headed pins secured to said inwardly extending flange of one of said rim sections and extending axially inwardly therefrom, the other of said rim sections having apertures in its inwardly extending flange adapted to engage said headed pins when said means are engaged with said rim sections but to enable disengagement of said rim sections upon arcuate movement of one of said rim sections with relation to the other, said aperture flange having recesses formed therein in one side thereof adjacent the apertures to receive said headed pins when said rim sections are moved axially apart and prevent arcuate movement of one of said rim sections with relation to the other.

WINFIELD S. BRINK.